United States Patent [19]

Imaida et al.

[11] Patent Number: 5,478,284
[45] Date of Patent: Dec. 26, 1995

[54] BEARING ARRANGEMENT FOR CONTINUOUSLY VARIABLE TRANSMISSIONS

[75] Inventors: Makoto Imaida, Zama; Kiyofumi Tanaka, Machida, both of Japan

[73] Assignee: Nissan Motor Co., Ltd., Yokohama, Japan

[21] Appl. No.: 310,403

[22] Filed: Sep. 22, 1994

[30] Foreign Application Priority Data

Oct. 15, 1993 [JP] Japan .................................. 5-281867

[51] Int. Cl.⁶ .................................................. F16H 55/52
[52] U.S. Cl. .......................................... 474/8; 474/43
[58] Field of Search ................................ 474/8, 11, 12, 474/17, 25, 43, 44

[56] References Cited

U.S. PATENT DOCUMENTS

| | | | |
|---|---|---|---|
| 3,174,348 | 3/1965 | Luenberger | 474/43 |
| 3,727,477 | 4/1973 | Murphy | 474/44 X |
| 4,820,243 | 4/1989 | Fub | 474/43 |

Primary Examiner—Michael Powell Buiz
Attorney, Agent, or Firm—Foley & Lardner

[57] ABSTRACT

In a continuously variable transmission, a bolt hole of a casing and a female screw hole of a bearing fixing plate are arranged such that the bolt hole positionally corresponds to the female screw hole when an outer diameter portion of a bearing is engaged with a recess of the plate, and a pin of the plate is inserted into a positioning hole of the casing.

4 Claims, 2 Drawing Sheets

BEARING ARRANGEMENT FOR CONTINUOUSLY VARIABLE TRANSMISSIONS

BACKGROUND OF THE INVENTION

The present invention relates generally to a bearing arrangement for continuously variable transmissions and more particularly, to a structure for fixing a bearing.

Conventionally, a generally flat bearing fixing plate with a female screw formed is used in a bearing fixing structure for continuously variable transmissions. Upon assembling, the bearing fixing plate is held directly, and positioned so as to engage a bolt with a female screw.

With the conventional bearing fixing structure for continuously variable transmissions, however, since less margin for space is found around the bearing fixing plate, there arises a problem with regard to a deterioration in working efficiency such as a difficult visual positioning, etc.

It is, therefore, an object of the present invention to provide a bearing arrangement for a continuously variable transmission which allows an easy mounting of a bearing.

SUMMARY OF THE INVENTION

According to one aspect of tile present invention, there is provided a bearing arrangement for a continuously variable transmission which includes a shaft, first and second conical members disposed thereon to define a V-shaped groove for a V-belt, and a casing having first and second holes, the bearing arrangement comprising:

a bearing arranged to rotatably support the shaft;

a plate arranged to fix said bearing to the casing, said plate having a recess with an inner diameter large enough to be engaged with an outer diameter portion of said bearing, a pin inserted into the first hole of the casing, and a third hole;

means for positioning the second hole of the casing with respect to said third hole of said plate; and a bolt engaged with said third hole of said plate through the second hole of the casing.

According to another aspect of the present invention, there is provided, in a continuously variable transmission for a motor vehicle, said continuously variable transmission having a V-belt:

a shaft;

first and second conical members disposed on said shaft, said first and second conical members serving to define a V-shaped groove for the V-belt;

a casing arranged to conceal said shaft, said casing having first and second holes;

a bearing arranged to rotatably support said shaft;

a plate arranged to fix said bearing to said casing, said plate having a recess with an inner diameter large enough to be engaged with an outer diameter portion of said bearing, a pin inserted into said first hole of said casing, and a third hole;

means for positioning said second hole of said casing with respect to said third hole of said plate; and a bolt engaged with said third hole of said plate through said second hole of said casing.

DETAILED DESCRIPTION OF THE INVENTION

Figure 2:
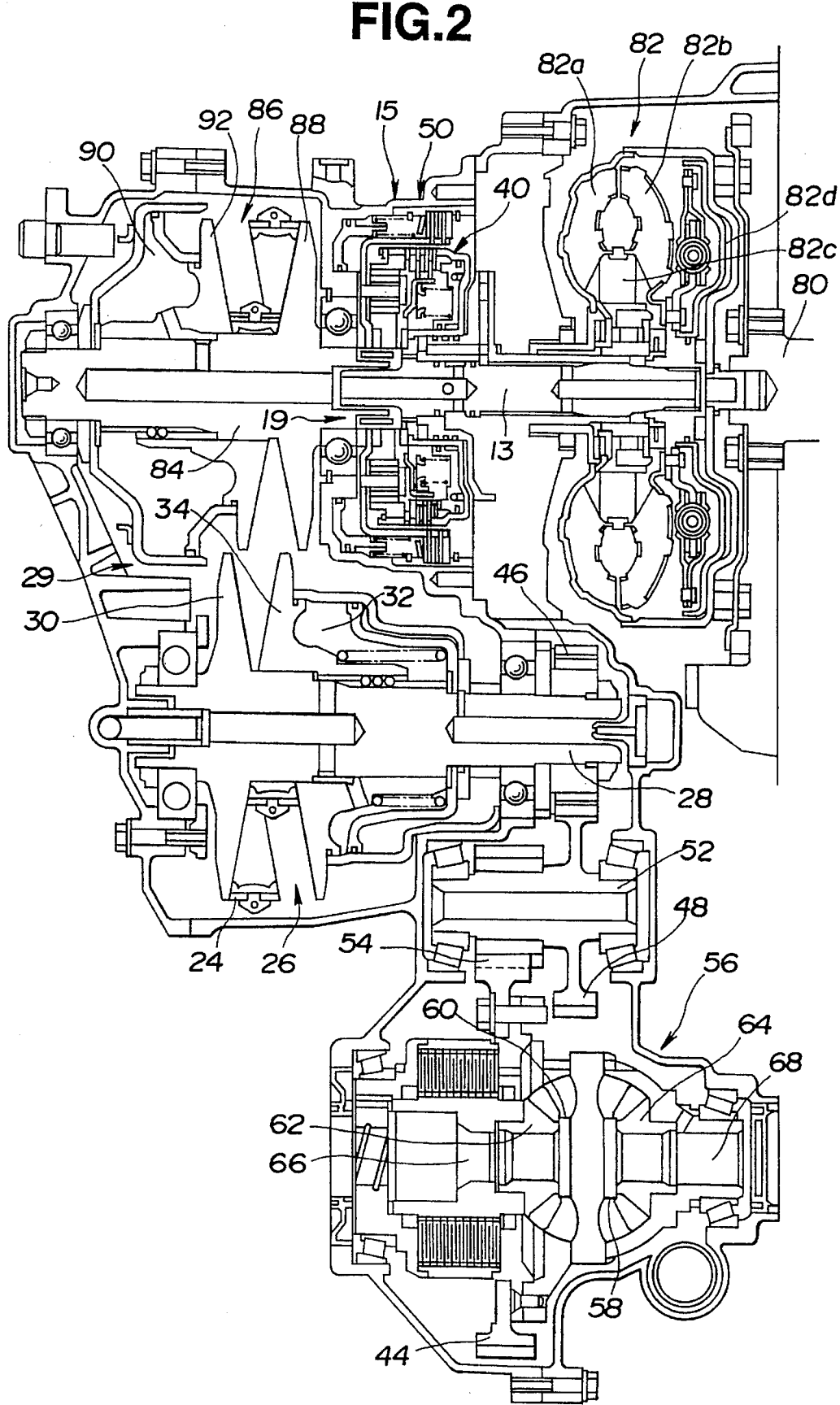
FIG. 2 is a sectional view showing the continuously variable transmission.

Referring to FIG. 2, a continuously variable transmission comprises generally a torque converter 82 (which may be replaced with a fluid coupling), a forward/backward changeover device 15, a V-belt type continuously variable transmission 29, and a differential gear 56, and allows a transmission of a rotation of an engine output shaft 80 to drive shafts 66, 68 in a predetermined speed ratio and a predetermined direction of rotation. The continuously variable transmission comprises the torque converter 82 (which includes a pump impeller 82a, a turbine runner 82b, a stator 82c, a lockup clutch 82d, etc.), an input shaft 13, an output shaft 84, the forward/backward changeover device 15, a drive pulley 86 (which includes a stationary conical member 88, a drive pulley cylinder chamber 90, a movable conical member 92, etc.), a V-belt 24, a follower belt 26 (which includes a stationary conical member 30, a follower pulley cylinder chamber 32, a movable conical member 34, etc.), a follower shaft 28, a drive gear 46, an idler gear 48, an idler shaft 52, a pinion gear 54, a final gear 44, a pinion gear 58, a pinion gear 60, a side gear 62, a side gear 64, a drive shaft 66, and a drive shaft 68. A detailed description will be made with regard to the forward/backward changeover device 15 only. For the structure of the other components, see JP-A 61-105353.

Figure 1:
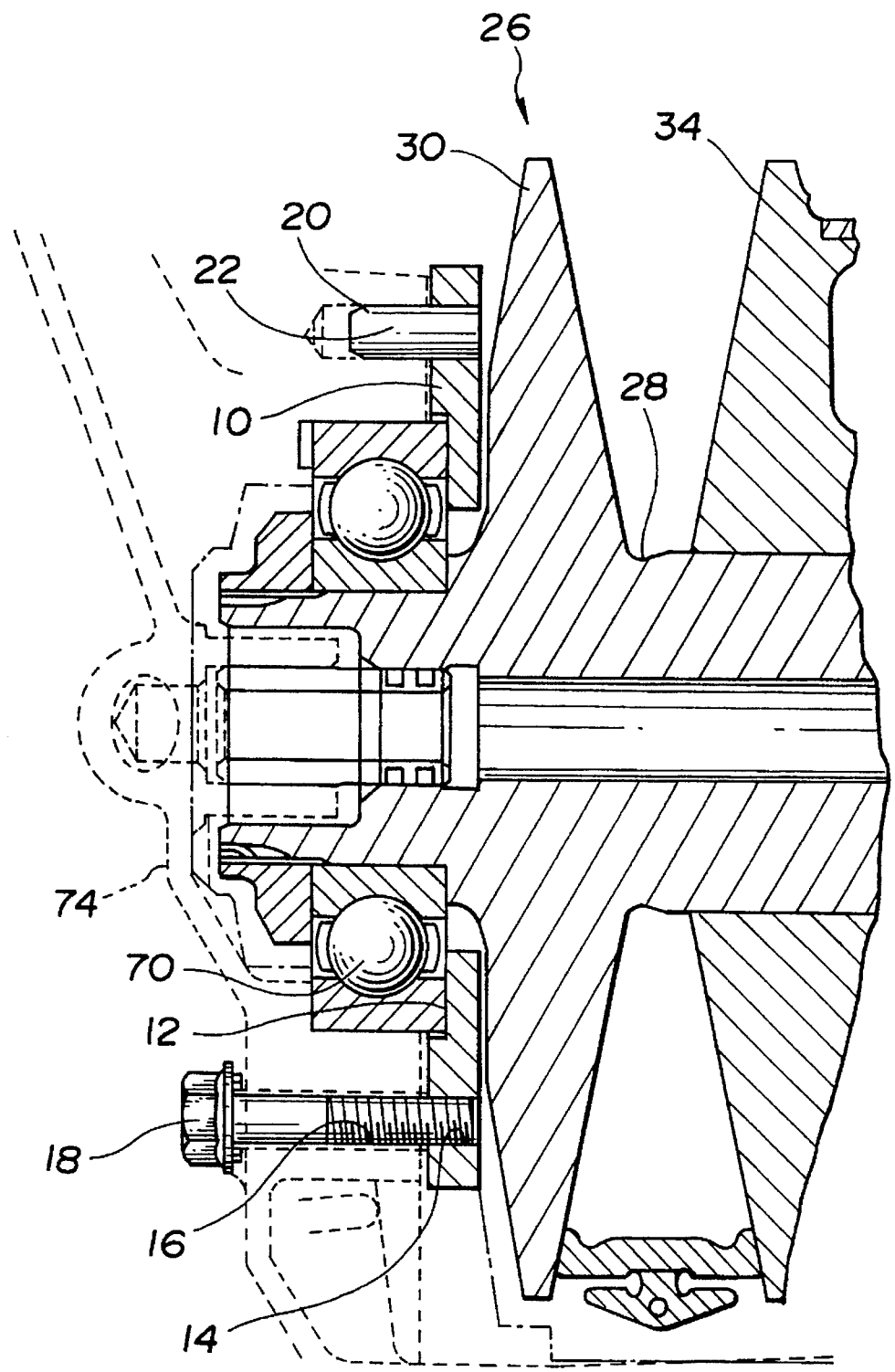
FIG. 1 is a fragmentary sectional view showing a preferred embodiment of a bearing arrangement for a continuously variable transmission according to the present invention.

Referring to FIG. 1, the follower pulley 26 of the continuously variable transmission as shown in FIG. 1 will be described in detail. As described above, the follower pulley 26 comprises the stationary conical member 30 and the movable conical member 34 arranged opposite thereto so as to form a V-shaped groove space. The stationary conical member 80 is integrally formed with the follower shaft 28. The movable conical member 34 is axially movably supported on the follower shaft 28 through a ball spline (not shown). The follower shaft 28 is rotatably supported by a bearing 70. The bearing 70 is assembled to a casing 74 by a bearing fixing plate 10. Specifically, the bearing fixing plate 10 has a face which is opposite to the bearing 70 and formed with a recess 12 which allows a radial positioning of the bearing 70 when engaged with an outer diameter portion thereof. Therefore, when the bearing 70 is engaged with the recess 12, a movement of the bearing fixing plate 10 is restrained in the radial direction of the bearing 70. Moreover, arranged to the face of the bearing fixing plate 10 opposite to the bearing 70 is a positioning pin 22 which is engageable with a positioning hole or first hole 20 of the casing 74. When the positioning pin 22 is inserted into the positioning hole 20, a movement of the bearing fixing plate 10 is restrained in the circumferential direction thereof. The bearing fixing plate 10 has a female screw hole or third hole 14 formed in such a position as to correspond to a bolt hole or second hole 16 of the casing 74 in the state that the bearing 70 is engaged with the recess 12 of the bearing fixing plate 10, and the positioning pin 22 is inserted into the positioning hole 20 of the casing 74. The bearing fixing plate 10 is fixed to the casing 74 by a fixing bolt 18 to be driven through the female screw hole 14 of the bearing fixing plate 10 and the bolt hole 16 of the casing 74.

Next, the method of assembling the bearing 70 to the casing 74 will be described. First, the outer diameter portion of the bearing 70 is engaged with the recess 12 of the bearing fixing plate 10. Together with the bearing fixing plate 10, an inner diameter portion of the bearing 70 is engaged with an outer diameter portion of the follower shaft 28. Then, the casing 74 is disposed on the left side of the follower shaft 28 as viewed in FIG. 1. In that event, a position of the bearing fixing plate 10 is set so that the positioning pin 22 of the bearing fixing plate 10 is inserted into the positioning hole 20 of the casing 74. By this, a movement of the bearing fixing plate 10 is restrained in the circumferential direction thereof. Moreover, in that event, since the bearing 70 is also fixed to the casing 74, a movement of the bearing fixing plate 10 is also restrained in the radial direction thereof. As described above, an arrangement of the bearing fixing plate 10 serves for a positional coincidence of the bolt hole 16 of the casing 74 with the female screw hole 14 of the bearing fixing plate 10. Then, from the outside of the casing 74, the fixing bolt 18 is driven through the bolt hole 16 of the casing 74 and the female screw hole 14 of the bearing fixing plate 10. By this, the bearing fixing plate 10 is fixed to the casing 74, so that the follower shaft 28 is rotatably supported to the casing 74.

Having described the present invention in connection with the preferred embodiment, it is to be noted that the present invention is not limited thereto, and various changes and modifications are possible without departing from the spirit of the present invention.

What is claimed:

1. A bearing arrangement for a continuously variable transmission which includes a shaft, first and second conical members disposed thereon to define a V-shaped groove for a V-belt, and a casing having first and second holes, the bearing arrangement comprising:

a bearing arranged to rotatably support the shaft;

a plate arranged to fix said bearing to the casing, said plate having a recess with an inner diameter large enough to be engaged with an outer diameter portion of said bearing, a pin inserted into the first hole of the casing, and a third hole;

means for positioning the second hole of the casing with respect to said third hole of said plate; and a bolt engaged with said third hole of said plate through the second hole of the casing.

2. A bearing arrangement as claimed in claim 1, wherein said positioning means are in the form of an arrangement of the second hole of the casing and said third hole of said plate such that the second hole positionally corresponds to said third hole when said outer diameter portion of said bearing is engaged with said recess of said plate, and said pin of said plate is inserted into the first hole of the casing.

3. In a continuously variable transmission for a motor vehicle, said continuously variable transmission having a V-belt:

a shaft;

first and second conical members disposed on said shaft, said first and second conical members serving to define a V-shaped groove for the V-belt;

a casing arranged to conceal said shaft, said casing having first and second holes;

a bearing arranged to rotatably support said shaft;

a plate arranged to fix said bearing to said casing, said plate having a recess with an inner diameter large enough to be engaged with an outer diameter portion of said bearing, a pin inserted into said first hole of said casing, and a third hole;

means for positioning said second hole of said casing with respect to said third hole of said plate; and a bolt engaged with said third hole of said plate through said second hole of said casing.

4. A continuously variable transmission as claimed in claim 3, wherein said positioning means are in the form of an arrangement of said second hole of said casing and said third hole of said plate such that said second hole positionally corresponds to said third hole when said outer diameter portion of said bearing is engaged with said recess of said plate, and said pin of said plate is inserted into said first hole of said casing.

* * * * *